United States Patent [19]

Debus, Jr. et al.

[11] Patent Number: 4,710,891

[45] Date of Patent: Dec. 1, 1987

[54] DIGITAL SYNTHESIS TECHNIQUE FOR PULSES HAVING PREDETERMINED TIME AND FREQUENCY DOMAIN CHARACTERISTICS

[75] Inventors: Walter Debus, Jr., Nottingham; Thomas L. Osborne, Sandown, both of N.H.; Curtis A. Siller, Jr., Andover, Mass.

[73] Assignee: Ameican Telephone and Telegraph Company, AT&T Bell Laboratories, Murray Hill, N.J.

[21] Appl. No.: 517,803

[22] Filed: Jul. 27, 1983

[51] Int. Cl.$^4$ ............................................... G06F 1/02
[52] U.S. Cl. .................................................... 364/718
[58] Field of Search ................................ 364/718–722, 364/851, 852, 717, 724; 307/106, 260, 261, 264; 328/14; 381/43, 37, 47

[56] References Cited

U.S. PATENT DOCUMENTS

| | | | |
|---|---|---|---|
| 3,518,662 | 6/1970 | Nakagome | 340/347 R |
| 3,763,364 | 10/1973 | Deutsch et al. | 364/718 |
| 3,898,446 | 8/1975 | Vatz | 364/721 |
| 4,064,363 | 12/1977 | Malm | 387/37 |
| 4,146,931 | 3/1979 | Delforge | 364/724 |
| 4,184,049 | 1/1980 | Crochiere et al. | 381/37 |
| 4,238,779 | 12/1980 | Dickinson et al. | 371/5 |
| 4,326,260 | 4/1982 | Gross | 364/718 |
| 4,327,419 | 4/1982 | Deutsch et al. | 364/717 |
| 4,342,245 | 8/1982 | Gross | 364/718 |
| 4,375,777 | 3/1983 | Nishimoto | 364/721 |
| 4,482,974 | 11/1984 | Kovalick | 364/721 |
| 4,509,186 | 4/1985 | Omura et al. | 381/43 |
| 4,618,966 | 10/1986 | Stepp et al. | 364/721 |

FOREIGN PATENT DOCUMENTS 1533918  3/1967  France .

OTHER PUBLICATIONS

Hallmark, *The Master IC Cookbook*, pp. 350–351, TAB Books 1980.
Boutin et al., "Analysis and Design of a ROM Synthesizer as an Optimum digital Transmit filter", 3rd *International Conferences on Digital Satellite Communications*, pp. 87–90, Nov. 1975.
"Further Results on Nyquist's Problem in Pusle Transmission", *IEEE Trans. on Comm. Tech.*, Apr. 1968, L. E. Franks, pp. 337–340.
"Synthesis of Pulse-Shaping Networks . . . ", *BSTJ*, Sep. 1969, D. A. Spaulding, pp. 2425–2444.
"A New Approach to Optimum Pulse Shaping . . . ", *BSTJ*, May–Jun., 1973, K. H. Mueller, pp. 723–729.

*Primary Examiner*—Gary V. Harkcom
*Assistant Examiner*—Dale M. Shaw
*Attorney, Agent, or Firm*—John Francis Moran; Patrick E. Roberts; Joseph A. Cameron

[57] ABSTRACT

A digital synthesis technique provides pulse shaping in accordance with predetermined time domain and frequency domain constraints. In the technique, the informational content of a binary bit stream is used by an access circuit (12) to form address words for accessing a read-only-memory (13). The digital representations stored in the ROM (13) represent a superposition of temporally-displaced truncated impulse time functions, each weighted by the discrete transmission symbol levels of the analog output signal. The digital representations from two ROMs (13-1 and 13-2) are toggled by a sequencng circuit. In other embodiments of the invention, different memory arrangements ranging from a signal ROM (142) to an array of ROMS (163-1 through 163-3 and 164-1 through 164-3) are respectively used to decrease circuit complexity. In a digital radio transmission application of the technique, this arrangement is economical, readily reproducible and stable since it obviates the need for conventional complex analog filters.

9 Claims, 8 Drawing Figures

DIGITAL SYNTHESIS TECHNIQUE FOR PULSES HAVING PREDETERMINED TIME AND FREQUENCY DOMAIN CHARACTERISTICS

BACKGROUND OF THE INVENTION

This invention relates to digital synthesis as an alternative to conventional analog or digital filtering techniques and, more particularly, it relates to a table lookup technique for producing a spectrally shaped, time varying waveform from a sequence of symbol states.

There are a number of drawbacks associated with present implementations of filters. For analog filters, these concerns relate to precision of components, manufacturing reproducibility, lengthy development times and cost of depolyment. For digital filtering, the concerns relate to operational speed and cost of deployment. The real time signal processing used in digital filters typically involves combining weighted versions of a number of temporally spaced signals such as those produced at various taps of a delay line. This weighting is also referred to as the coefficients used in the time domain filtering of digital signals. Such weighting operations are typically performed by digital multipliers. Since digital multiplication is an involved operation, complex circuitry is required to provide the function. The speed limitations of multipliers also renders them economically prohibitive for, or unable to handle the high data rates associated with, the high capacity and the bandlimited transmission of modern communications systems.

In such applications, the demands on filtering must be high in order to provide the desired baseband signals with precise spectral shaping. To meet these demands, analog filters have been traditionally used. However, these analog filters are difficult to design, require time consuming individual tuning during manufacture, are relatively expensive, and are subject to performance deterioration with age or temperature extremes. Moreover, since analog filters are frequency dependent, each time a new system with a different symbol rate or spectral characteristic is used the filters must be completely redesigned. In fact, present symbol rates and modulation techniques are approaching the performance limitations of analog filter technology, which are also at rates beyond the operational speed of conventional digital filter circuit techniques.

SUMMARY OF THE INVENTION

A technique of synthesizing spectrally shaped digital signals conforming to prescribed time domain and frequency domain criteria is based on the recognition that the impulse response of most filtering functions spread in time but also decay quickly with time.

More specifically, a digital signal of controlled spectral content is represented by the superposition of individual impulse time functions, each temporally displaced from its adjacent impulse time function by a symbol period, and each impulse time function appropriately weighted by its associated symbol state. That is a theoretically complete description of this digital signal is expressible as $$s(t) = \sum_{n=-\infty}^{\infty} a_n p(t - nT) \quad (1)$$

where: $s(t)$ is the digital signal in the time domain, $a_n$ are the symbol states of the digital signal, $p(t)$ is the impulse time function, and $T$ is the symbol period.

Truncating $p(t)$ permits $s(t)$ to be closely represented by a finite number of temporally displaced, truncated impulse functions, each appropriately weighted by a symbol state, $a_n$. Using a binary code to define each transmitted symbol state, the ensuing limited sequence of sequential data states, $\{a_n\}$, forms an address. In response to this address, at least two predetermined digital representations are called from memory and subsequently converted to an analog signal to form the synthesized signal of controlled spectral content during each baud interval. Moreover, since the incoming data stream can be random, the finite address to memory can also be random, thereby inferring random addressing of the memory. Additionally, within each signaling interval, $T$, at least two coded digital representations are retrieved from memory to fully and uniquely define the spectral content of the synthesized output signal. (This condition meets the familiar Nyquist sampling criterion.)

In some further aspects of the invention, different memory arrangements are employed. One such arrangement reduces circuit complexity while another arrangement illustrates an effective memory expansion in the form of an array. The latter increases the ability to characterize the output signal spectra with precision without reducing the speed of informational content in the output signal or requiring impractical memory arrangements in terms of both size and speed requirements.

BRIEF DESCRIPTION OF THE DRAWING

Features, advantages and objects of the invention will be more fully appreciated from the following detailed description when considered in conjunction with the accompanying drawing.

DETAILED DESCRIPTION

Figure 1:
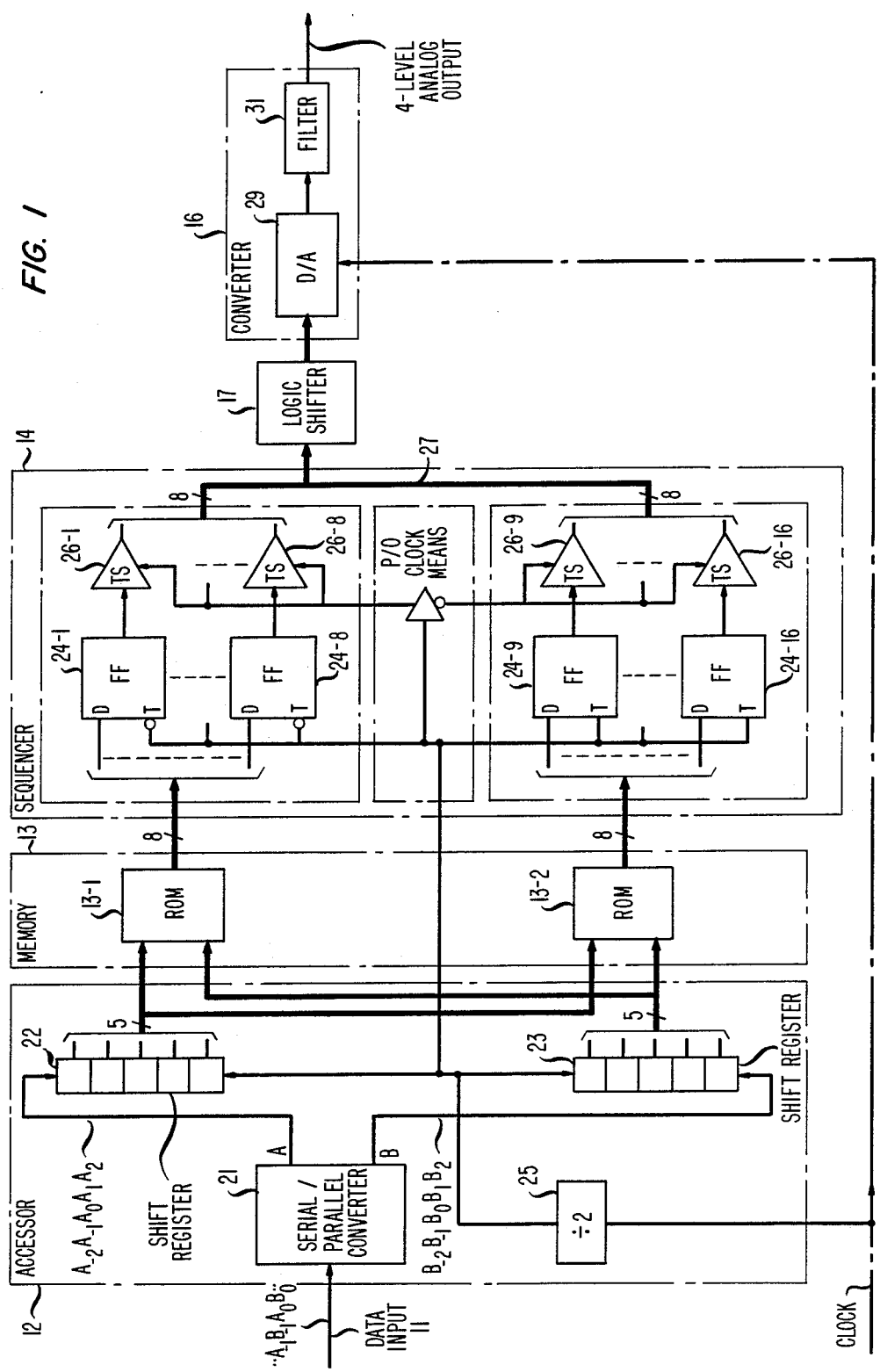
FIG. 1 is a block diagram employing the inventive digital synthesis technique.

In FIG. 1, an illustrative embodiment of the invention performs the digital synthesis technique to produce an analog output signal ideally suited for the radio transmission of spectrally shapd four-level pulse code modulated (PCM) digital signals. Each of these four nominal levels corresponds to a particular combination of two successive bits designated at data input 11 as an "AB" pair.

The basic configuration of the circuit of FIG. 1 includes accessor 12 which takes sequential combinations of bits in the incoming data signals to provide successive parallel addresses for memory 13. Connected to the output of memory 13 is sequencer 14 which alternates between the two sections (ROM 13-1 and ROM 13-2) of memory 13 to provide an appropriate sequence of parallel groups of digitally coded bits for application to converter 16 via logic shifter 17. Logic shifter 17 is required only because sequencer 14 uses TTL devices and converter 16 uses ECL devices. Since the ECL logic is balanced and relatively low impedance, it provides a measure of noise immunity. Converter 16 produces a particular form of analog signal corresponding to a spectrally shaped fourlevel PCM digital signal at the baud rate associated with the transmission system.

Accessor 12 initially includes serial-to-parallel converter 21 which has two outputs, one feeding shift register 22 and the other feeding shift register 23. Shift registers 22 and 23 each include five cells of digital delay elements, which may be viewed as a tapped delay line providing the memory required to establish past, present and future bit combinations or AB bit pairs which together as a parallel group provides each address for memory 13.

The data input of accessor 12 constitutes independent coded values which, when viewed in succession, can form a random sequence. The random aspect of this sequence is significant since in prior signal synthesis applications a periodic signal is generated and the address sequentially calls up information from memory.

In memory 13, ROM 13-1 and ROM 13-2 have identical storage capacity. Each ROM produces a particular parallel bit combination for each address applied at its input. Each ROM thus produces one of the two coded samples associated with each baud interval. Each of the ROM outputs appear at the same time and are maintained over the entire baud interval. Accordingly, sequencer 14 serves to select one of the outputs and then the other during each baud interval.

Sequencer 14 includes a D type flip-flop with cells designated 24-1 through 24-8 for ROM 13-1 and cells designated 24-9 through 24-16 for ROM 13-2, which are clocked at the baud rate provided by the output of divider 25. The use of eight flip-flop cells at the outputs of each of ROM 13-1 and ROM 13-2 corresponds to the 8-bit digital word from each of these ROMs. Thus, the input to divider 25 is clock signal operating at twice the baud rate. Connected to each of the two groups of cells 24 at the output of sequencer 14 is a group of tristate buffer devices. Each one of the first group of tristates is designated as 26-1 through 26-8 for ROM 13-1. Each one of the second group of tristates is designated as 26-9 through 26-16 and provides the output for ROM 13-2. Each section of tristate 26 is a high speed driver for one conductor of output bus 27. Accordingly during each baud interval two 8-bit words appear on output bus 27 as sequencer 14 toggles back and forth between the outputs of ROMS 13-1 and 13-2.

These output words are applied to converter 16 after undergoing an appropriate level shift produced by logic shifter 17. In converter 16, each 8-bit word is translated into an appropriate analog signal level by D/A converter 29. The output of converter 29 is lowpass filtered by filter 31. Although the output signal corresponds to a spectrally shaped four-level digital signal at the baud rate, 1/T, two output samples are produced by converter 29, one corresponding to ROM 13-1 and the other to ROM 13-2, during each baud interval.

It should be understood that although the digital synthesis technique is described in an application associated with digital radio transmission, the technique is a general approach and may therefore be used in numerous other applications. It should be also pointed out that although the technique is general, it is particularly advantageous in situations wherein digital multipliers are neither suitable nor desirable for providing real time signal processing.

Figure 2:
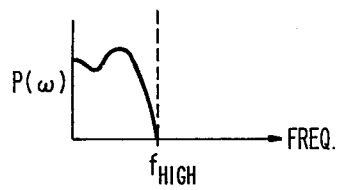
FIGS. 2 through 6 depict frequency response and time domain representations utilized to provide the considerations relevant to the basic approach of the digital synthesis technique.
Figure 4:
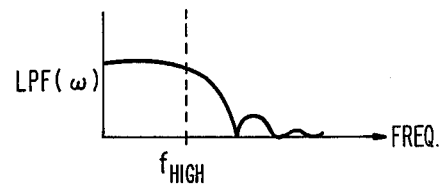
Figure 3:
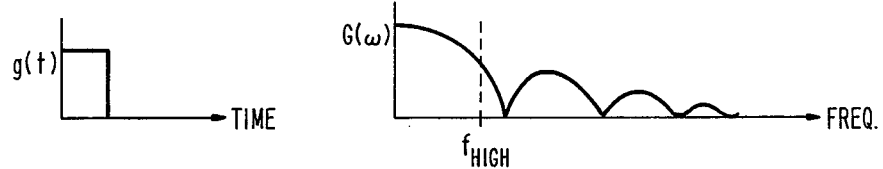

The transmission application of this technique, as well as the fundamental considerations of the general technique, can best be understood by reference to FIGS. 2 through 6. FIG. 2 depicts a graph of a predetermined bandlimited spectrum $P(\omega)$. This bandlimited spectrum is defined in terms of both amplitude and phase. It is then necessary to define the reconstruction pulses $g(t)$ in the time domain, which usually take the form of rectangular sample-and-hold pulses like that shown in the left hand portion of FIG. 3. The right hand portion of FIG. 3 corresponds to the frequency spectrum of $g(t)$, denoted $G(\omega)$. The next step is to define the frequency characteristic of the lowpass reconstruction filter that removes periodicity from the synthesized spectrum. (In some applications, this reconstruction filter may not be required.) The frequency response of this lowpass filter is designated $LPF(\omega)$ and is depicted in FIG. 4. The informational content stored in the memory utilized in the inventive synthesis technique is derived by first defining a spectrum $S(\omega)$ given by $$S(\omega) = \frac{P(\omega)}{G(\omega)LPF(\omega)} \text{ for } \omega \geq 0 \quad (2)$$

$$S(\omega) = \frac{P(|\omega|)}{G(|\omega|)LPF(|\omega|)} * \text{ for } \omega < 0 \quad (3)$$

where * symbolizes the complex conjugate and $|\omega|$ is the absolute value of $\omega$. We next convert $S(\omega)$ to the time domain by analytically or numerically forming the inverse Fourier transform. The characteristic impulse time function is then expressible as $$p(t) = F^{-1}S(\omega) \quad (4)$$

Figure 5:
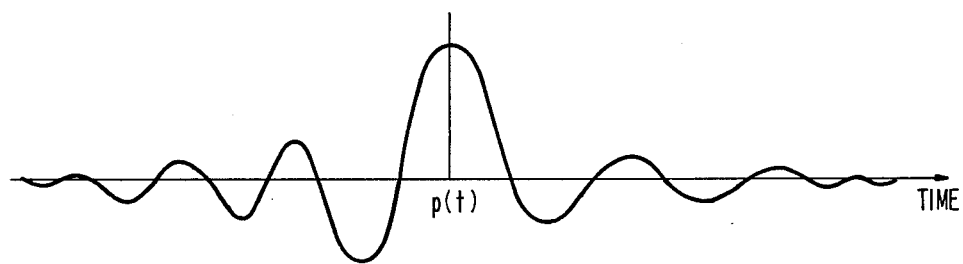

FIG. 5 illustrates a typical time domain impulse function, a truncated portion of which is emulated by the synthesis technique. Note that each impulse function, to be appropriately weighted by a transmitted symbol state, spreads out in time in both directions to influence or be superimposed with neighboring impulse functions, similarly weighted by their transmitted symbol state. Although each impulse response of a bandlimited signal theoretically rings or spreads forever, a truncated impulse response is sufficient since the magnitude of the impulse time function decays rapidly with time. A truncated version of $p(t)$, denoted $p'(t)$, is illustrated in FIG. 6 and defined by the following relationship $$p'(t) = p(t) T_l \leq t \leq T_u \quad (5)$$

$$p'(t) = 0 - \infty < t < T_l, \ T_u < t < \infty \quad (6)$$

Figure 6:
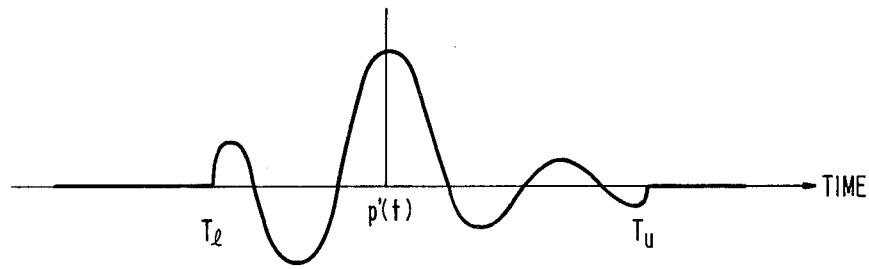

Accordingly, the impulse response of FIG. 6 is used to define the spectrally shaped synthesized signal, this synthesized signal is composed primarily of the transmission symbol state occupying its baud interval with weighted contributions of the impulse response from neighboring transmission symbol states occupying neighboring baud intervals.

For the illustrative case embodied in FIG. 1, a series of five successive transmission symbol states weighting an appropriate truncated impulse function is used to represent the current transmitted digital signal.

In the radio transmission application of the present digital synthesis technique, the desired baseband spectral shape is the conventional half Nyquist characteristic. More specifically, the filtering function is commonly shared between the transmitter and receiver coupled together via the radio transmission channel. Thus, the synthesis technique could provide the time domain equivalent of a flat-phase, raised-cosine, half Nyquist (square root of Nyquist) spectrum for a four-level spectrally shaped digital signal transmitter operating at 22.5 megabaud. For 45% roll off, such a spectrum, when matched against an analytic half-Nyquist receiver filter, results in only 6.9% peak eye closure. Of course, those skilled in the art are free to choose any desirable spectrum while employing these inventive principles.

It should be understood that the impulse response function for an application of the inventive technique remains constant. Each transmission symbol then provides a weighting for its component of the truncated impulse function. Collectively, each currently transmitted symbol is a function of the weighting assigned to its impulse function plus the weighting assigned to each neighboring impulse function by the value of their respective transmission symbol states. Finally, the amount contributed from an impulse response of a neighboring transmission symbol must take into account its temporal relationship, or time displacement, from the current transmission symbol. If an interval is defined as $T' = 1/f_{high}$, then two values of p'(t) are required for each T' time interval. Let the symbol period, i.e., baud interval, T, be less than T', T<T', and select two time points of p'(t) in each interval T. Although it is convenient for the time points to be equally spaced, the time points need not be equally spaced. For application to FIG. 1, the values stored in ROM 13-1 may be expressed as:

$$s(0T) = A_{-2}p'(-2T) + a_{-1}p'(-T) + a_0p'(0T) + a_1p'(1T) + a_2p'(2T) \quad (7)$$

Each a is a transmission symbol state related to the number of levels in the PCM spectrally shaped output signal as originally coded in the incoming data stream (e.g. ±1 and ±3 for a four level signal with two bits defining each of the four levels). Since each a is indicated by a binary code group, the sequence $\{a_n\}$ is suitable for use as a digital address to memory 13-1. At that address, the digital representation s(0T) is stored as a digital word.

For m elements in the address sequence and L levels of the spectrally shaped PCM output signal, there are $L^m$ required memory locations and therefore $L^m$ digital values for s(0T).

For ROM 13-2, the digital output representations are offset by $\epsilon T$. Thus $$s(\epsilon T) = a_{-2}p'(-2T + \epsilon T) + a_{-1}p'(-1T + \epsilon T) + a_0p'(0T + \epsilon T) + a_1p'(1T + \epsilon T) + a_2p'(2T + \epsilon T) \quad (8)$$

Again, for the set of digital representations of $s(\epsilon T)$, there are $L^m$ different values. Of course, the duration of the time reconstruction pulses shown in FIG. 3 from the output of D/A converter 29 should be less than $\epsilon T$.

In FIG. 1, the sequential arrangement of incoming data bits is identified at input 11 and the two parallel outputs of converter 21. The current transmission symbol state is defined by the $A_0B_0$ bit pair. The past transmission symbol states are indicated by AB bit pairs with positive subscripts while the future transmission symbol states are indicated by AB bit pairs with negative subscripts. Of course, the numerical values of the subscripts indicate their temporal proximity, in symbol periods T, to the currently transmitted symbol.

Figure 7:
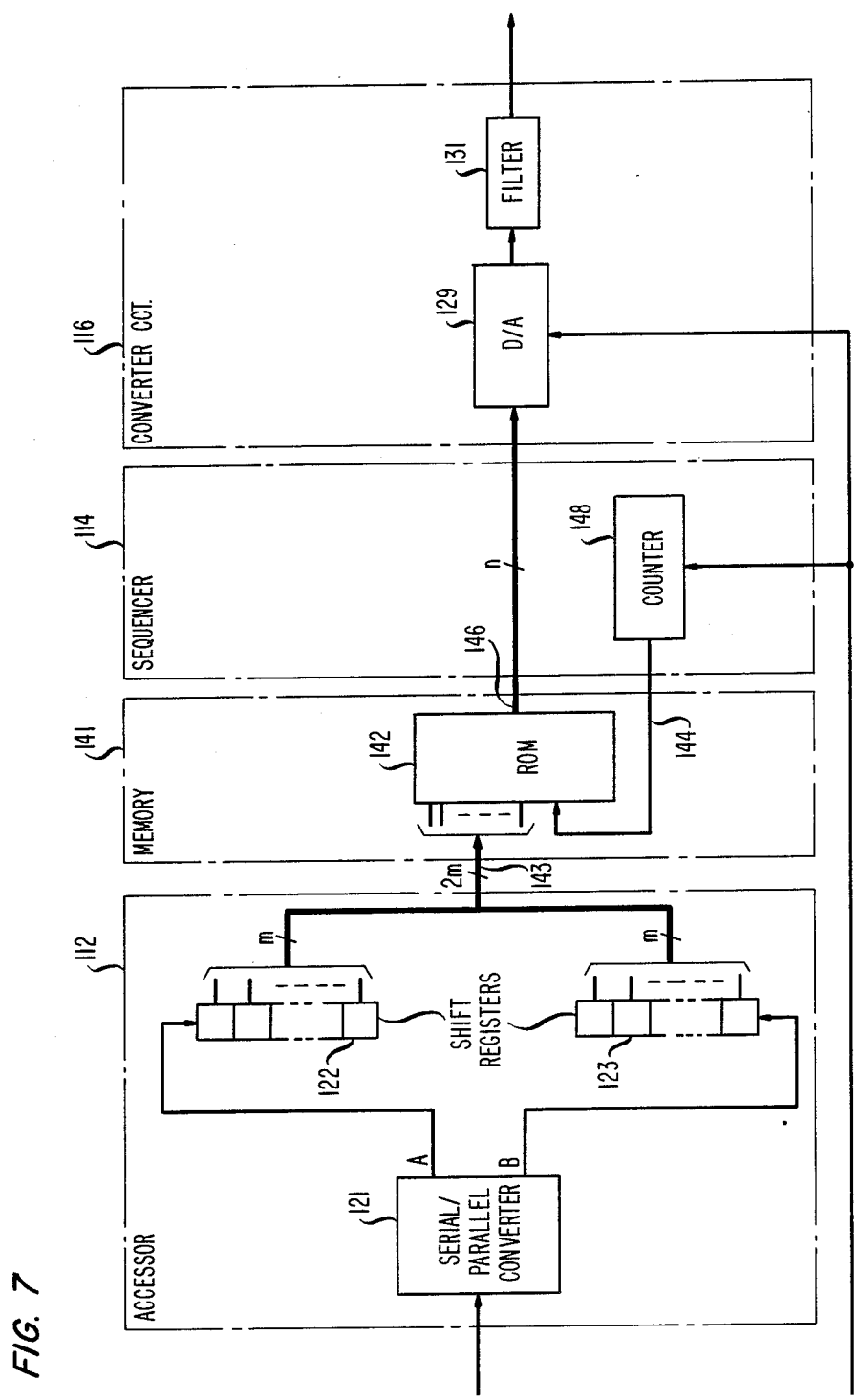
FIG. 7 is an alternative block diagram employing a single memory.

FIG. 7 is another embodiment which uses a different memory arrangement. Accessor 112 and its internal components, converter 121 and shift registers 122 and 123 have essentially the same function and structure as corresponding components of FIG. 1. In fact, reference numerals in FIG. 7 whose last two digits correpond to those in FIG. 1 are used to indicate equivalent components. With respect to FIG. 1, the same comment applies to converter circuit 116 which includes D/A converter 129 and lowpass filter 131. The remaining circuitry in FIG. 7 is what makes it different from FIG. 1. Namely, memory 141 comprises single ROM 142 whose input includes address bus 143 and conductor 144. The output of ROM 142 appears on bus 146 and is, in this case, applied directly to converter circuit 116.

The arrangement of FIG. 7, with a reduced circuit count from that of FIG. 1, is better suited for lower speed applications where the readout time of ROM 142 does not impose a limit on performance. The number of address input leads to ROM 142 is 2m+1. Bus 143 provides 2m inputs to ROM 142 with one input to ROM 142 as conductor 144 coming from counter 148. The output of counter 148 is at a logical one level for a portion of the baud interval and then switches to another logical level for the remaining portion of the baud interval. In this way, two locations are accessed in ROM 142 for each single address on bus 143. Bus 146 therefore provides two coded outputs during each baud interval. Each coded output includes n parallel bits as a digital representation for conversion to an appropriate analog level by D/A converter 129.

Figure 8:
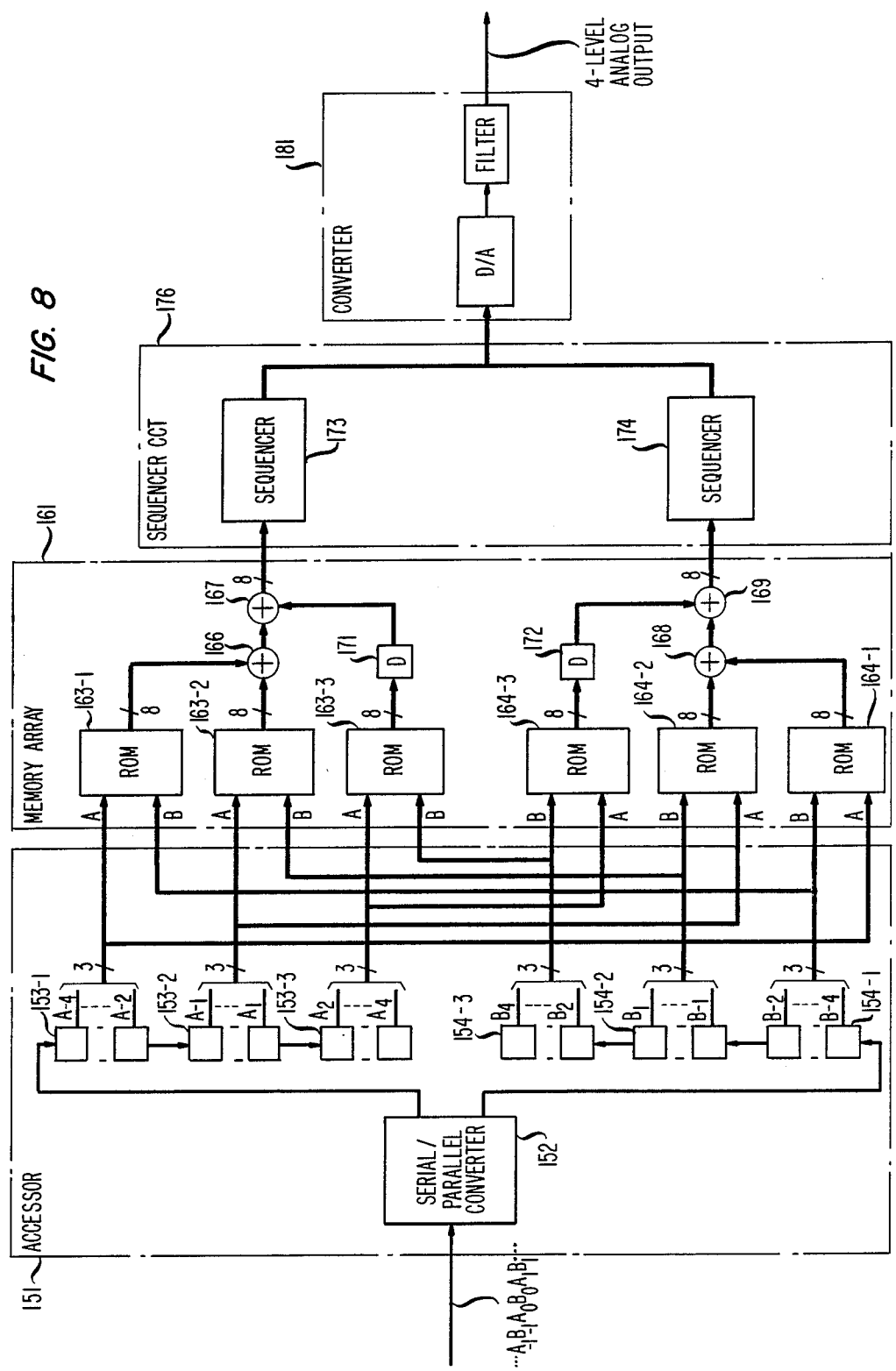
FIG. 8 illustrates an arrangement for implementing the present technique using a memory array.

FIG. 8 provides a convenient arrangement for expanding the overall synthesizer memory using an array of multiple ROMS. In general, for an L-level signal with m impulse response contributions, $L^m$ memory locations are required. For example, a 16 quadrature amplitude modulated (QAM) signal using 4-level signals on each rail and a truncated sequence of m=9 impulse response requires $4^9 = 262,144$ addressable locations. For high speed applications (greater than 20 MHz) requiring appropriately short ROM access times, there is no single ROM available with this much memory capacity with current technology. Even for low speed applications (e.g. less than 5 MHz), memory requirements rapidly outstrip existing, commercially available, ROM technology. Accordingly, FIG. 8 illustrates a convenient and realistic technique for "expanding" available memory, thus permitting spectral synthesis for longer impulse function descriptions and/or greater modulation levels. If a 4-level signal is considered with nine integral-T and nine fractional-T impulse function contributors during each baud interval, each of the two ROMs that are used in accordance with the arrangement of FIG. 1 requires more than 262 thousand addressable locations to describe the composite output signal s(t). For this illustration, $$s(0T) = a_{-4}p'(-4T) + a_{-3}p'(-3T) + a_{-2}p'(-2T) + \quad (9)$$
$$a_{-1}p'(-1T) + a_0p'(0T) + a_1p'(1T) +$$
$$a_2p'(2T) + a_3p'(3T) + a_4p'(4T)$$

and $$s(\epsilon T) = a_{-4}p'(-4T + \epsilon T)a_{-3}p'(-3T + \epsilon T) + \quad (10)$$

-continued
$$a_{-2}p'(-2T + \epsilon T) + a_{-1}p'(-1T + \epsilon T) + a_0 p'(0T + \epsilon T) +$$
$$a_1 p'(1T + \epsilon T) + a_2 p'(2T + \epsilon T) +$$
$$a_3 p'(3T + \epsilon T) + a_4 p'(4T + \epsilon T)$$

where: p(t) is defined by equation (4); S($\omega$) is defined by equations (2) and (3); and p'(t) is defined by equations (5) and (6) with $T_l = -4T$ and $T_u = 4T + \epsilon T$. Equations (9) and (10) illustrate the additive nature of the synthesis process. The total contributions to s(OT) and s($\epsilon$T) can be broken down into several partial summations:

$$s(0T) = s(-4T, -3T, -2T) + s(-1T, 0T, 1T) + s(2T, 3T, 4T) \quad (11)$$

$$s(\epsilon T) = s(-4T + \epsilon T, -3T + \epsilon T, -2T + \epsilon T) + \quad (12)$$

$$s(-1T + \epsilon T, 0T + \epsilon T, 1T + \epsilon T) + s(2T + \epsilon T, 3T + \epsilon T, 4T + \epsilon T)$$

where each term above is made up of the sum of three corresponding terms in equations (9) and (10). Each partial sum requires fewer addresses (hence less memory) and is definable using readily available memory. The outputs of these smaller memory sections are then added together to produce the total output.

In FIG. 8, accessor 151 includes serial to parallel converter 152 whose two outputs are applied to shift registers 153-1 to 153-3 and 154-1 to 154-3. Each section of shift registers 153 and 154 produces 3-bits in parallel as an output. Accordingly, there are three 3-bit portions of the address which are connected as illustrated in FIG. 8 to address memory array 161 which includes individual ROMS 163-1 through 163-3 and 164-1 through 164-3. In response to each address, each of ROMS 163 and 164 produces a k-bit output word which are added together by combiners 166 through 169. Delays 171 and 172 are used to correct for the propagation delay between the input and output of adders 166 and 168, respectively. Adders 167 and 169 thus produce digital representations which are alternatively applied to converter circuit 181 via sequencer 173 and 174 in sequencer circuit 176. In this case, sequencer 173 produces the code words corresponding the integral-T outputs, s(OT), while sequencer 174 produces the code words corresponding fractional-T outputs, s($\epsilon$T). Each coded or digital representation is a composite defined in terms of a truncated sequence of nine transmission symbol states. For this illustrative case, each of ROMS 163-1, 163-2, 163-3, 164-1, 164-2, and 164-3 requires $L^m$ or $4^3 = 64$ memory locations. Thus, six ROMs each requiring 64 memory locations accomplish the same memory function as two ROMs, each requiring $2^9 = 262,144$ memory locations.

It is again pointed out that although two coded samples are required during each baud interval to completely define the desired output spectrum, the two samples need not be equally spaced. However, as a matter of convenience, the equal spacing is more desirable from a circuit implementation standpoint.

It should be apparent from the circuit of FIG. 8 that after it is decided to use a memory array, a multitude of arrangement options become available to the designer. Numerous performance and cost advantages may be attained by the circuit designer. These include various input address and output configurations centered around truncated impulse function length, memory size and speed considerations.

Illustrations of the inventive signal synthesis technique shown in FIGS. 1, 7 and 8 all relate to 4-level PCM transmission. The inventive technique is applicable to any-level PCM transmission for which each of the 6 transmission levels are definable in terms of a finite code of binary bits. For example, two such consecutive bits define each level in 4-level transmission, three such consecutive bits define each level in 8-level transmission, etc. For 8-level transmission, the binary bit stream is expressible as . . . $A_{-1}B_{-1}C_{-1}A_0B_0C_0A_1B_1C_1$. . . The serial/parallel converter in the accessor of FIGS. 1, 7 and 8 would therefore provide three output lines, one each for the A, B and C bits. These three lines are passed to three sections of shift registers, the outputs of which are used to form addresses for the ROMs. The memory techniques embodied in FIGS. 1, 7 and 8 are again applicable to any level of transmission.

Some of the more basic considerations in a particular application include the number of transmission symbol states (i.e. levels), the time span over which the truncated impulse function and symbol sequence are defined, and the number of quantizing levels required in the memory output digital word and input to the digital-to-analog converter. Other considerations include the type of lowpass reconstruction filter characteristic desired, if required at all, and how to proportion the overall signal spectral shaping between the transmitter and receiver in a transmission application of the inventive signal synthesis technique. For example, the synthesized signal may provide compensation for the aperture effect and predistortion in a corrupted transmission channel, or relax filtering requirements at the communication receiver. These items, of course, only represent some of the numerous and varied other modifications which may become apparent to those skilled in the art while employing these inventive principles.

What is claimed is:

1. Apparatus for synthesizing a multi-level coded signal with predetermined time domain and frequency domain characteristics in response to a binary input data stream;

said signal defined in terms of discrete amplitude states, each amplitude state corresponding to a symbol representing a unique group of at least two input bits, said apparatus comprising:

accessing means for converting a predetermined number greater than one, m, of said symbols into at least one address, said accessing means comprising accumulating means for accumulating m symbols in respective successive address positions and shifting means for shifting each of said symbols one address position to change the address at the symbol rate, each new address comprising one new symbol and m−1 old symbols;

digital output means comprising memory means addressed by said accessing means for producing at least two digital representations for each symbol period;

said digital representations corresponding to a composite formed by the superposition of m individual and identical impulse time functions temporally displaced one from another by the symbol interval, each function weighted according to the discrete amplitude state and temporally displaced according to the position in the input data stream of the respective corresponding symbol of the m symbols forming said at least one address; and digital-to-analog converting means connected to said digital output means for converting said digital representations to said multi-level coded signal.

2. Apparatus as in claim 1 wherein m is an odd integer.

3. Apparatus as in claim 1 wherein said digital output means produces two digital representations for each symbol period.

4. Apparatus as in claim 1 wherein said memory means comprises at least two memory blocks, each of said memory blocks being addressed by said at least one address and storing a respective one of said at least two digital representations.

5. Apparatus as in claim 4 wherein said digital output means further comprises sequencing means connected to said at least two memory blocks for producing said at least two digital representations in predetermined successive time intervals.

6. Apparatus as in claim 1 wherein said memory means comprises a plurality of memory units, each addressed by a respective portion of said at least one address, and each producing partial digital representations corresponding to a composite formed by the super position of weighted and spaced time functions corresponding to the respective symbols forming said address portion.

7. Apparatus as in claim 6 wherein said digital to analog converting means further comprises summing means said multilevel coded signal corresponding to the sum of said partial digital representations.

8. Apparatus as in claim 7 wherein said summing means produces a digital sum of said partial digital representations.

9. Apparatus for synthesizing a multi-level coded signal with predetermined time domain and frequency domain characteristics in response to a binary input date stream;

said signal defined in terms of discrete amplitude states, each amplitude state corresponding to a symbol representing a unique group of at least two input bits, said apparatus comprising: accessing means for converting a predetermined number greater than 1, m, of said symbols into at elast one address, said accessing means comprising serial to parallel converting means for dividing said binary input data stream into a plurality of individual bit streams corresponding to the number of bits represented by a symbol, and an equal plurality of shift registers connected to respective individual bit streams, said shift registers collectively accumulating m symbols in respective successive address positions and shifting each of said symbols one address position to change the address at the symbol rate, said at least one address comprising the contents of all of said shift registers, and each new address comprising one new symbol and m−1 old symbols; digital output means comprising memory means addressed by said accessing means for producing at least two digital representations for each symbol period; said digital representations corresponding to a composite formed by the superposition of m individual and identical impulse time functions temporally displaced one from another by the symbol interval, each function weighted according to the discrete amplitude state and temporally displaced according to the position in the input data stream of the respective corresponding symbol of the m symbols forming said at least one address; and digital-to-analog converting means connected to said digital output means for converting said digital representations to said multi-level coded signal.

* * * * *